United States Patent [19]
Jada et al.

[11] Patent Number: 4,584,365
[45] Date of Patent: Apr. 22, 1986

[54] PRODUCTION OF POLYMER FROM METAL ALKOXIDE AND REACTION MIXTURE OF CARBOXYLIC ACID AND HYDROXY COMPOUND

[75] Inventors: Sivananda S. Jada, Englewood; Jon F. Bauer, Littleton, both of Colo.

[73] Assignee: Manville Sales Corporation, Denver, Colo.

[21] Appl. No.: 702,095

[22] Filed: Feb. 15, 1985

[51] Int. Cl.$^4$ .............................................. C08G 77/02
[52] U.S. Cl. ...................................... 528/271; 528/9; 528/26
[58] Field of Search ............................... 528/271, 9, 26

[56] References Cited

U.S. PATENT DOCUMENTS 4,476,156 10/1984 Brinker et al. ......................... 427/82
4,514,555 4/1985 Taniguchi et al. .................. 528/271

OTHER PUBLICATIONS

Condensed Chemical Dictionary; Eighth Edition; p. 784.

Hackh's Chemical Dictionary, Fourth Edition, p. 611.

Primary Examiner—Harold D. Anderson
Attorney, Agent, or Firm—John D. Lister; Cornelius P. Quinn; Gregory A. Evearitt

[57] ABSTRACT

A process for the production of polymeric substances from metal alkoxides is provided comprising the steps of:
(a) reacting at least a monofunctional carboxylic acid and at least a monofunctional hydroxylated organic compound in the presence of a suitable esterification catalyst to yield water in situ, and thereafter;
(b) adding to the reaction mixture in (a) above at least a divalent metal alkoxide in an amount sufficient to form the desired polymeric network of at least partially hydrolyzed metal alkoxide.

Also provided is a process for coating a substrate comprising applying the above disclosed polymeric substance to a substrate preferably by a dipping, spraying, or spinning technique. Articles coated with the polymeric substance provided by the process of the present invention are also disclosed.

12 Claims, No Drawings

PRODUCTION OF POLYMER FROM METAL ALKOXIDE AND REACTION MIXTURE OF CARBOXYLIC ACID AND HYDROXY COMPOUND

This invention relates to a novel process for the production of polymeric substances from metal alkoxides. In particular, this invention relates to a novel process for the production of polymeric glass-like films and coatings from metal alkoxides. In another aspect, it relates to a process for coating a substrate with a polymeric based coating, in particular a glass-like film coating. In a further aspect it relates to articles coated with the polymeric composition formed by the process of the present invention.

Various substances have been developed in the past for use as coatings and films to be applied to metal, glass, and ceramic substrates by simple commercial processes such as spraying, dipping, or spinning. Typically, such substances developed for use as coating and films were organic polymer based coatings. While some organic polymer based materials found some degree of commercial acceptance, many of them had very limited performances in hostile environments, i.e. high temperature, corrosive, or abrasive environments.

In recent years there has been a continuing interest in developing metal-based polymeric coatings, especially glass-like coatings, as substitutes for organic-polymer based ones. Ideally, such a coating should be refractory, corrosion resistant, electrically insulating, flexible enough to be coated on a wire, and also be applicable at low temperatures compatible with the desired substrate.

Typically, these metal based coatings are made by the so-called sol-gel process. In this process, metal alkoxides of network forming cations, e.g., Si, Al, B, Ti, etc. are used as glass precursors. According to the typical process, the metal alkoxides, such as silcon alkoxide represented by the general formula $(Si(OR)_4$ wherein R typically represents an alkyl radical, are dissolved first in an alcohol solvent and then hydrolyzed by adding water, usually in a stoichiometric molar excess amount. The hydrolysis can be typically represented by the following equation using silicon alkoxide as an example:

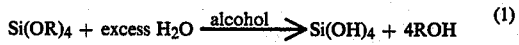

$$Si(OR)_4 + \text{excess } H_2O \xrightarrow{\text{alcohol}} Si(OH)_4 + 4ROH \quad (1)$$

Thus, according to equation (1) above, by the standard method one achieves predominantly a tetrahydroxy-substituted silicon molecule. These molecules are then polymerized, resulting in a bulky, randomly cross-linked type polymeric coating.

While the above process is conventional and has been widely used, it is not without drawbacks. Chief among them is the uncontrolled hydrolysis which results from using excess molar amounts of water. By the above reaction process illustrated in equation (1), one not only forms large quantities of $Si(OH)_4$ but lesser amounts of $Si(OR)_3(OH)$, $Si(OR)_2(OH)_2$ and $Si(OR)(OH)_3$ are formed in solution as well. Just because all four of the reactive silicon alkoxide species are present does not mean that they are all efficiently utilized to form the desired polymer. For example, any $Si(OR)_3(OH)$ alkoxides which are formed in solution will only couple together and not be capable of polymerizing into higher molecular weights because of the presence of only one hydroxyl group on each silicon molecule. Any $Si(OR)(OH)_3$ which is formed will only react with its counterpart to form a bulky three-dimensional type polymeric coating. The $Si(OR)_2(OH)_2$ species in solution will react to some extent to form linear type polymeric coatings. Thus, utilizing the process of equation (1) results in an inefficient utilization of the silicon alkoxide because of the uncontrolled hydrolysis to yield the above mentioned four different reaction products types in solution.

Another drawback to the standard process is that the resulting product that is achieved is a bulky three dimensional type coating. Such coatings have tended to have shrinkage and brittleness problems when used on some substrates. Furthermore, a predetermined molecular weight of the polymeric coatings formed according to equation (1) is hard to achieve because of the uncontrollable nature of the hydrolysis.

Still another drawback to the standard process is the external addition of $H_2O$ to the reaction mixture even when it is not added in excess molar amounts. As shown by the examples later herein, such external addition of $H_2O$ can result in polymeric substances which become hard and brittle and therefore unsuitable for use as coatings and films. The evacuation of excess water leads to increased pores in the desired gels and eventually the final product would be brittle and cracked.

Consequently, research was conducted in order to find a process which would not only result in a more controlled, efficient hydrolysis of the metal alkoxide substrate but lend itself more readily to producing a polymeric coating of desired molecular weight and flexibility as well.

During the course of such research, we discovered that by hydrolyzing a metal alkoxide by the controlled release of water generated in-situ as a reaction by-product, there is achieved a more efficient, controlled hydrolysis compared to the prior utilized standard process of equation (1). By the controlled hydrolysis of metal alkoxide, one is also able to achieve a final polymeric product of desired dimensions and molecular weight. Additionally, by using water developed in situ (i.e. internally) in the hydrolysis rather than added externally as in conventional, prior art processes, one achieves a polymeric substance particularly useful as a coating because of trhe coating's non-brittleness. This contrasts with the more brittle products made by the prior art process.

That our invention results in the above advantages can be readily seen and understood by the following example. Assume for illustrative purposes only that one desires a more flexible two-dimensional polymeric coating. By reacting two moles each of carboxylic acid and alcohol together in the presence of a suitable catalyst, one will generate two moles of $H_2O$ in situ. By subsequently contacting a silicon alkoxide of the formula $Si(OR)_4$ with the two moles of water, hydrolysis will occur according to the following equation:

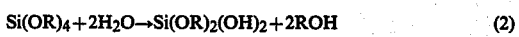

$$Si(OR)_4 + 2H_2O \rightarrow Si(OR)_2(OH)_2 + 2ROH \quad (2)$$

Thus, the resulting formed $Si(OR)_2(OH)_2$ molecules are polymerized into a flexible two-dimensinal polymeric based coating as illustrated below:

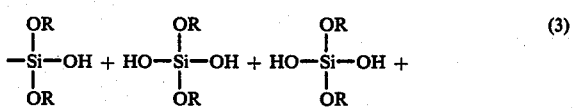

$$\begin{array}{ccc} \text{OR} & \text{OR} & \text{OR} \\ | & | & | \\ -\text{Si}-\text{OH} + \text{HO}-\text{Si}-\text{OH} + \text{HO}-\text{Si}-\text{OH} + \\ | & | & | \\ \text{OR} & \text{OR} & \text{OR} \end{array} \quad (3)$$

-continued

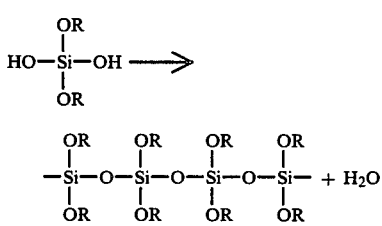

The above result is easily achievable according to the inventive process. By forming the water is situ through the reaction of two reactants (a carboxylic acid and an alcohol) in the desired molar amounts, one can precisely fine-tune the amount of water formed in situ with a view towards controlling how much hydrolysis of the metal alkoxide one ultimately desires. For example, someone wanting to form the polymer as illustrated in Equation (3) would merely have to react 2 moles of acid with 2 moles of alcohol in order to form 2 moles of water, the precise amount needed to hydrolyze the Si(OR)$_4$ to the degree required. The result is not easily achievable by the process of equation (1) because of the uncontrolled hydrolysis which results. By utilizing the present invention, one is able to efficiently hydrolyze the metal alkoxide to form the desired polymeric coating.

Even if a three dimensional type coating is desirable, the process of the present invention is more efficient because one does not form four different types of reaction products which will not all react with one another in solution. By utilizing the present invention and therefore controlling the hydrolysis of the metal alkoxide, one could easily form only the one desired reaction product, either Si(OR)(OH)$_4$ or Si(OH)$_4$.

Another advantage of the present invention is that the hydrolysis and thus the polymerization reaction are enhanced because of the continual generation of water in the esterification reaction (4) as illustrated below:

$$R''COOH + ROH \rightleftharpoons H_2O + ROR'' \tag{4}$$

When the water generated above in situ is removed and used by the metal alkoxide for hydrolysis, the esterification equilibrium is altered. The reaction will proceed forward providing more water. Thus, there is a constant supply of water in the desired molar amount to continue the hydrolysis of, and therefore, the polymerization of the particular metal alkoxide. An additional advantage of the present invention is that any alcohol, ROH, formed in the hydrolysis reaction can be utilized in the esterification reaction.

Thus, it is an object of this invention to provide an efficient, novel process for the production of polymeric substances from metal alkoxides. It is also an object to provide a process for coating a substrate with a polymeric substance developed by the process of the present invention. Still a future object is to provide articles coated with a polymeric composition formed by the process of the present invention.

Other aspects, objects, and the several advantages of the present invention are apparent from the specification and appended claims.

In accordance with one embodiment of the present invention, there is provided a novel, efficient process for the production of polymeric substances from metal alkoxides comprising the steps of: (a) reacting at least a monofunctional carboxylic acid and at least a monofunctional hydroxylated organic compound together in the presence of a suitable esterification catalyst to yield water in situ; and thereafter (b) adding to the reaction mixture in (a) above at least a divalent metal alkoxide in an amount sufficient to form the desired polymeric network of at least partially hydrolyzed metal alkoxide.

Generally, the metal alkoxides used in the invention are represented by the general formula:

$$M(R)_a(OR)_b$$

M represents at leat one metal selected from Group II, Group III, Group IV, and transition metals. Preferably, M is selected from Si, Al, B, Ti, and Zr, and most preferably is Si.

R independently represents a 1–9 carbon hydrocarbyl radical, preferably a 1–6 carbon linear alkyl radical and most preferably an ethyl radical.

a represents an integer from 0 to 2, b represents an integer from 2 to 4 with the proviso that the sum of a and b does not exceed 6 and also satisifies the particular valence requirements of each individual metal M.

Representative but non-limiting examples of compounds falling within the structural formula $M(R)_a(OR)_b$ are: tetramethoxysilane, tetraethoxysilane, methyltrimethoxysilane, ethyltriethoxysilane, amyltriethoxysilane, trimethoxyborane, triethoxyborane, tetraethoxytitanium, and tributoxyaluminum.

The water used to hydrolyze the silicon alkoxide molecules in the present invention is generated in situ through the esterification reaction of a carboxylic acid of at least monofunctionality and at least a monofunctional hydroxylated organic compound. Such a reaction is well known to those skilled in the art and hence does not require a detailed explanation herein. Such a reaction may be conducted in the presence of any suitable acid or base esterification catalyst. An acid catalyst, typically mineral acids such as HCl (most preferred) and H$_2$SO$_4$, is used.

Given for illustrative purposes only and not to limit the scope of the present invention, the following pairs of carboxylic acid/hydroxylated organic compound are exemplary of those which can be used in the present invention in an esterification reaction to generate water in situ: acetic acid and ethanol; formic acid and ethanol; oxalic acid and diethylene glycol; adipic acid and diethylene glycol; acid and 1,4-cyclohexanediol; and sebacic acid and 1,2 propanediol.

Whatever combination of carboxylic acid and hydroxylated organic compound are employed in the present invention should be reacted in the presence of a suitable esterification catalyst at a temperature and for a time sufficient to achieve an equilibrium esterification reaction.

It is preferable in the present invention that the hydroxylated organic compound employed in the esterification reaction will correspond to the R portion of the silicon alkoxide. For example, with tetraethoxysilane, ethanol will be preferably used. In general though, as with the alkoxides, the higher the molecular weight of the hydroxylated organic compound, the slower will be the polymerization process for the polymeric network.

The silicon alkoxide hydrolysis reaction is usually carried out in the presence of some kind of polar organic solvent. Such a solvent is used to ensure adequate miscibility between the alkoxide and the water used for hydrolysis. In the present invention, the particular hydroxylated organic compound (usually an alcohol) used in the esterification reaction can be advantageously used for that purpose.

Additionally, the silicon alkoxide hydrolysis is usually carried out in the presence of a suitable catalyst, preferably an acid compound such as the ones used to catalyze the prior esterification reaction. As the hydrolysis reaction is typically carried out at a pH in the range of about 1-2.5, additional quantities of acid such as HCl, H₂SO₄, and HNO₃ may have to be added at this stage beyond the quantity already employed in the prior esterification reaction.

Basic hydrolysis can also be employed, usually being conducted at a pH of about 6-9. Suitable bases are NH₄OH or other equivalent weak bases.

More generally, suitable pH's are in the range of about 1-9, intermediate pH's being achieved by the addition of suitable buffer systems, the precise choice being composition dependent as is fully conventional.

In a preferred embodiment of the present invention, it has been found beneficial to employ two moles of H₂O in the hydrolysis reaction. The two moles of water are easily achieved and made constant through the reaction of two moles of carboxylic acid and two moles of hydrolylated organic compound in the esterification reaction. When the metal alkoxide is added to the reaction mixture, a linear two-dimensional polymeric type product will result. This linear polymeric product makes an excellent coating or film because of its flexibility and non-brittleness.

It has also been found preferable in the present invention to control the addition of the metal alkoxide to the hydrolysis reaction mixture over a period of time. It is most preferable to add the metal alkoxide to the hydrolysis reaction mixture over about a 5 hour time period.

Once the polymeric network of at least partially hydrolyzed metal alhoxide is formed, other ingredients may be added to the reaction mixture to impart desired properties to the polymeric substance.

Thus, in accordance with a preferred embodiment of the present invention, the resulting formed polymeric network of at least partially hydrolyzed metal alkoxide may be further reacted with a reactive substance represented by the general formula:

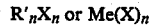

wherein R' represents a hydrocarbyl radical, Me represents a metal selected from Group II, Group III, Group IV, and transition metals, X represents an entity which will react with any hydrolyzed or unhydrolyzed substituents of said metal alkoxide in order to form a bond between either R' or Me and said metal alkoxide via an oxygen atom, and n is an integer of 1 or greater.

Preferably R' represents a 1-6 carbon hydrocarbyl radical, X represents either a —COOH group, a —OH group, a halogen atom or an alkoxy radical. Me is preferably selected from Al, B, Ti, and Zr.

Given below for illustrative purposes only and not to limit the present invention is an illustration of the mechanism of how the R'ₙXₙ and Me(X)ₙ reactive species are bonded to the metal alkoxide:

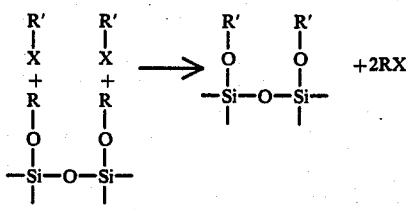

Thus as seen by the above illustration, R'ₙXₙ (and also Me(X)ₙ in he same manner although not shown) reacts with the unhydrolyzed alkoxide (OR) group of the polymeric substance and is bonded thereto via an oxygen atom. It is also possible that X could react with any hydrolyzed substituents.

By incorporating a particular R' or Me into the polymer network as shown by the above mechanism, additionally desired properties can be incorporated into the polymer network. For example, R' may represent a polymer which has a high degree of flexibility or Me may represent a particular metal such as Al which has good refractory properties.

In another embodiment of the present invention, the polymeric network can then be applied as a solution to a substrate to achieve the advantageous coating or film of this invention in a one-step, preferably low temperature operation to achieve a readily varied thin coating in the range of 0.1-100 mm, or other thickness as desired. In addition to the low temperature and thickness control, the coatings are also advantageous in that they have higher flexibility than prior art coatings.

The solutions can be applied to the substrate in any conventional fashion such as dipping, spraying, or spinning (especially in conjunction with semiconductor substrates).

Illustratively, thickness control can be achieved, e.g., in a dipping operation, by control of any of the following parameters: (a) concentrating the sol-gel solution; (2) viscosity of the sol-gel solution; (3) dipping speed; (4) dipping angle; etc. In a spraying operation, the first two parameters as well as the spraying time can also be used to control thickness.

The amount of solution applied to the substrate in a given operation will be fully conventionally determined. e.g., by conventional consideration of the amount of ingredients in solution. The solution is normally applied at room temperature but, of course, can be used in any given application. Similarly, it is also possible to preheat the substrate and apply the solution thereto.

The solution application onto the substrate can be carried out under normal atmospheric conditions. However, when dictated by conventional considerations, these steps can be carried out in an inert, reducing, or oxidative atmosphere, or even in vacuo, if necessary. The applied film or coating dries rapidly which is a significant advantage for commercial application.

The film and coatings made by the process of this invention can be applied to substrate surfaces where it is desired to render the same insulating, abrasion resistant, impervious, etc. The normal application is for protection of the underlying substrate. However, optical applications are also possible by suitable conventional control of the thickness of the layer.

There is essentially no limitation on the substrate surfaces themselves to which the films or coatings made by the process of the present invention can be applied. Metals, glasses, ceramics, semi-conductors, etc. can all be coated.

The following examples further illustrate the present invention.

EXAMPLE I

This example illustrates the conventional practice of metal alkoxide hydrolysis and subsequent polymerization through the direct addition of water to the reaction mixture.

41.6 grams (0.2 moles) of tetraethoxysilane (TEOS) and 92 grams (2 moles) of anhydrous ethanol solvent were added to a beaker and mixed together. The pH of the resulting mixture was adjusted to about 2.0 by the addition of concentrated HCl. 7.2 grams (0.4 moles) of $H_2O$ were added to the beaker with the pH maintained continuously by the addition of concentrated HCl. The contents of the beaker were then mixed for about 15 minutes. Two samples of the resulting reaction solution were then taken. One was allowed to sit at room temperature overnight while the other one was heated at 60° C. in an oven overnight. The next day when both samples were checked they had both turned solid and very brittle.

Therefore, it is illustrated here that when water is added directly to the reaction mixture even when it is not in an excess stoichiometric molar amount that the resulting polymeric product is not always satisfactory for its intended use.

EXAMPLE II

This example illustrates the necessity of adding the metal alkoxide to the reaction mixture after the esterification reaction has proceeded as opposed to before it occurs.

1 mole of TEOS, 1 mole of acetic acid, 1 mole of anhydrous ethanol, and 0.01 moles of concentrated HCl were mixed together in a beaker and allowed to react at room temperature. After several hours, a solution sample of the reaction product was taken and was exposed to air for 3 days. At the end of that time the reaction product had gelled and was very brittle.

EXAMPLE III

This example illustrates the desirability of using $H_2O$ generated in situ for the metal alkoxide hydrolysis/condensation reaction.

2 moles of acetic acid and 2 moles of anhydrous ethanol were added to a beaker along with 0.02 moles of concentrated HCl. They were mixed together at room temperature for about 24 hours. 1 mole of TEOS was then added with the reaction solution agitated for about 16 hours. A sample of the reaction product was then taken and was exposed to air at room temperature for several hours. The solution had gelled but had not turned brittle.

Thus, the above reaction product, made according to the invention process, could be readily used as either a film or coating if desired.

Reasonable modifications and variations are possible from the foregoing disclosure without departing from either the spirit or scope of the present invention.

We claim:

1. A process for the production of a polymeric substance from a silicon alkoxide comprising steps of:
   (a) reacting at least a monofunctional carboxylic acid and at least a monofuntional hydroxylated organic compound in the presence of an esterification catalyst to yield a composition comprising water in situ, and thereafter;
   (b) adding to said composition comprising water in situ a silicon alkoxide in an amount sufficient to form a polymeric network of at least partially hydrolyzed silicon alkoxide.

2. A process according to claim 1 wherein said esterification catalyst is concentrated HCl.

3. A process according to claim 1 wherein the addition of said silicon alkoxide to said composition comprising water in situ is controlled over a period of time.

4. A process according to claim 1 wherein said silicon alkoxide is added to said composition comprising water in situ over a period of about 5 hours.

5. A process according to claim 1 wherein said silicon alkoxide is a linear $C_1$-$C_6$ alkoxide.

6. A process according to claim 5 wherein said monofunctional hydroxylated organic compound is an alcohol wherein the alcohol corresponds to the alkyl portion of said silicon alkoxide.

7. A process according to claim 1 wherein 2 moles of said carboxylic acid are reacted with 2 moles of said hydroxylated organic compound to yield 2 moles of water which is further reacted with said silicon alkoxide.

8. A process according to claim 1 wherein said silicon alkoxide is tetraethoxysilane.

9. A process for coating a substrate with a polymeric composition comprising applying to the substrate a solution containing a polymeric network of at least partially hydrolyzed silicon alkoxide prepared by the process comprising the steps of:
   (a) reacting at least a monofunctional carboxylic acid and at least monofunctional organic compound in the presence of an esterification catalyst to yield a composition comprising water in situ, and thereafter;
   (b) adding to said composition comprising water in situ a silicon alkoxide in an amount sufficient to form a polymeric network of at least partially hydrolyzed silicon alkoxide.

10. A process according to claim 9 wherein said solution is applied to the substrate by a dipping, spraying, or spinning technique.

11. A process according to claim 9 wherein said silicon alkoxide is a $C_1$ to $C_6$ linear alkoxide.

12. A process according to claim 9 wherein said silicon alkoxide is tetraethoxysilane.

* * * * *